United States Patent [19]

Lachey

[11] Patent Number: 4,880,173
[45] Date of Patent: Nov. 14, 1989

[54] WIRE SUPPLY METHOD AND APPARATUS

[75] Inventor: Richard N. Lachey, New Carlisle, Ohio

[73] Assignee: Globe Products Inc., Dayton, Ohio

[21] Appl. No.: 334,813

[22] Filed: Apr. 6, 1989

Related U.S. Application Data

[63] Continuation-in-part of Ser. No. 60,040, Jun. 9, 1987, abandoned.

[51] Int. Cl.⁴ .................. B65H 59/22; H01F 41/04
[52] U.S. Cl. .......................... 242/1.1 R; 242/7.11; 242/45; 242/149
[58] Field of Search ............. 242/1.1 R, 1.1 A, 1.1 E, 242/7.03, 7.07, 7.11, 45, 128, 129, 129.8, 137.1, 138, 140, 149

[56] References Cited

U.S. PATENT DOCUMENTS

| | | | |
|---|---|---|---|
| 2,487,889 | 11/1949 | Moore | 242/128 |
| 2,579,585 | 12/1951 | Klinksiek | 242/1.1 R |
| 2,643,075 | 6/1953 | Moore | 242/128 |
| 2,934,280 | 4/1960 | Mason | 242/1.1 R |
| 2,991,021 | 7/1961 | Batty | 242/1.1 R |
| 3,251,559 | 5/1966 | Moore | 242/1.1 R |
| 3,450,357 | 6/1969 | Olson | 242/1.1 R |
| 3,978,564 | 9/1976 | Font | 242/1.1 R |
| 4,062,502 | 12/1977 | Peck | 242/7.03 |
| 4,199,155 | 4/1980 | Lachey | 242/7.05 |

FOREIGN PATENT DOCUMENTS 569159 5/1945 United Kingdom ............ 242/1.1 R

Primary Examiner—Joseph J. Hail, III
Attorney, Agent, or Firm—Roger S. Dybvig

[57] ABSTRACT

Wire drawn from a tensioned supply into the wire inlet to a reciprocating and oscillating shuttle of a high speed stator winding machine is frictionally restrained by a convex friction plate when the shuttle approaches the end of each of its forward strokes. The friction plate is mounted on the rearward end of the shuttle and has a wire-engaging surface spaced rearwardly of and confronting the wire inlet to the shuttle. To optimize the restraint on the wire, adjustments are provided to vary both the length of time during which the wire is engaged with the wire-engaging surface and the length of the surface so engaged.

36 Claims, 3 Drawing Sheets

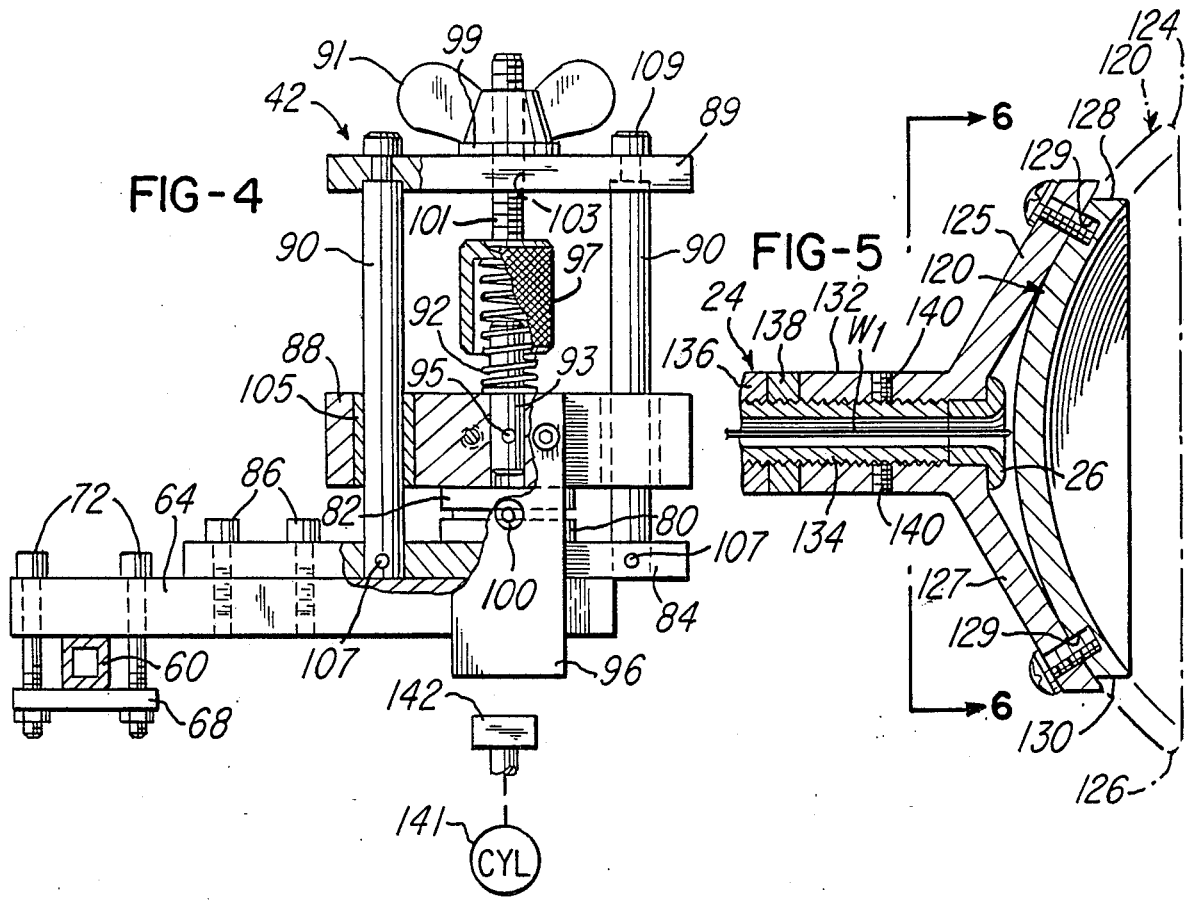
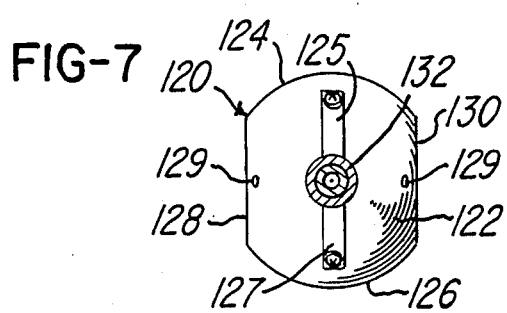
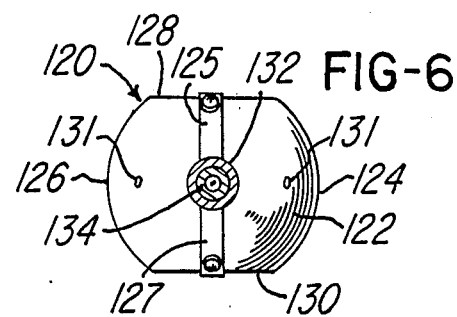
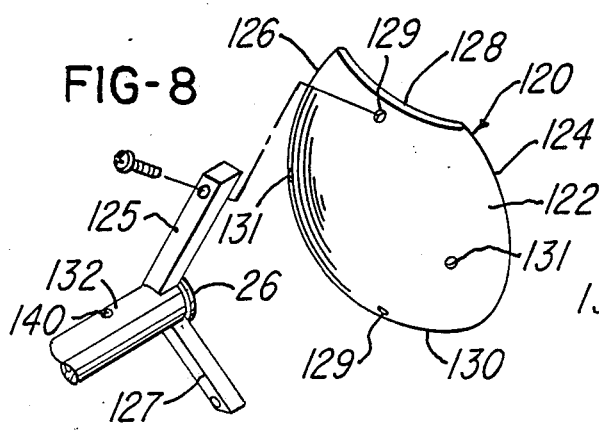
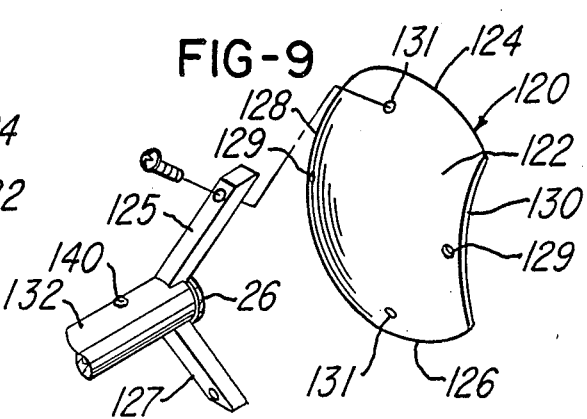

WIRE SUPPLY METHOD AND APPARATUS

This is a continuation-in-part of co-pending application Ser. No. 060,040 Filed on June 9, 1987, now abandoned.

BACKGROUND OF THE INVENTION

This invention relates to a wire supply method and apparatus particularly for stator winding machines. The method and apparatus of this invention are especially adapted for use in the high speed winding of 2-pole stators but the invention is not necessarily so limited.

Procedures for winding coils on 2-pole stators are described in U.S. Pat. No. Re 25,281 granted to H. W. Moore on Nov. 6, 1962 and U.S. Pat. No. 3,251,559 granted to H. W. Moore on May 17, 1966. A typical 2-pole stator winding machine includes a winding head or shuttle having a pair of wire guide nozzles or needles. Two wires, one for each of the needles, are coursed from a pair of wire supply spools through the shuttle and extended out of the needles. The shuttle is reciprocated to repeatedly pass in opposite directions through the stator core. At each end of its reciprocatory travel the shuttle is oscillated about its axis, the direction of oscillation being opposite at opposite ends of the stator. Accordingly, the coil end turns are formed during the oscillatory motions and the coil sides are formed during the reciprocatory motions of the shuttle.

At the beginning of the winding of coils on a stator, the forward ends of the wires are clamped or tied down and the wires exiting from the supply spools are coursed through wire tensioning and dereeling devices so that, ideally, the wires are under tension throughout the winding operation and the coil turns will closely follow the contours of the winding forms. A typical prior tensioning and dereeling device is shown in U.S. Pat. No. 2,643,075 granted to K. A. Moore on June 23, 1953.

A powered wire takeup device has also been used which operates in synchronism with the winding shuttle, such a takeup device being disclosed in the above mentioned U.S. Pat. No. 3,251,559. In general, the wire takeup device shown in the '559 patent draws wire when the winding head is not drawing wire and then releases the wire when the winding head is drawing wire so that there is a more uniform demand for wire from the dereeler. The apparatus shown in the '559 patent has been successfully used on stator winding machines having shuttle spindles which operate in the range of 800 or 900 complete strokes per minute.

It has been discovered that a combination of a dereeling device such as shown in the above mentioned K. A. Moore U.S. Pat. No. 2,643,075 and the powered wire takeup device shown in the H. W. Moore U.S. Pat. No. 3,251,559 do not adequately control the wire tension for stator winding machines having shuttle speeds operating in the range of 1000 or more complete strokes per minute. As a result, the wires exiting from the winding head of such machines may tend to balloon outwardly instead of closely following the guide surfaces which are provided for the wire. The wound coils have loosely formed turns and, especially with fine wire, breakage may occur.

More elaborate tensioning and dereeling devices have been developed especially for high speed winders operating in excess of 800 or 900 complete strokes per minute, one such device being shown in U.S. Pat. No. 4,062,502, granted to K. E. Peck, Jr., on Dec. 13, 1977. The apparatus of the '502 patent may be used with winding machines operating at shuttle speeds as high as 1200 complete strokes per minute but in some cases, particularly with fine wire, such apparatus is not successful in preventing wire breakage or loosely wound coils at that speed.

To date there has been no fully satisfactory device known to applicant developed for use with a high speed stator winder operating in the range of approximately 1200 complete strokes per minute or higher without the formation of loosely wound coils or without occasional wire breakage. Wire breakage is believed to be caused by abrupt reversals in the directions of shuttle movement and also because the momentum of the wires at the end of the reciprocating strokes causes them to balloon outwardly from the shuttle needles where they may become snagged on parts of the stator being wound or on nearby parts of the machine. It has been suggested to locate shields between the winding needles and parts on which the wires tend to snag. However, so far as known, no fully satisfactory shield has been developed. U.S. Pat. No. 4,199,115, issued to Richard N. Lachey on April 22, 1980, discloses a wire control device that may reduce the effects of wire ballooning in certain cases but does not fully overcome the problems of loosely wound coils and wire breakage. Recently, a demand has arisen for stator winding machines operating in the range of approximately 1800 or more complete strokes per minute and the known devices for supplying wire to the winding machine are inadequate to provide a reliable source of wire under the uniform tension needed to prevent loose coils and wire breakage.

SUMMARY OF THE INVENTION

A primary object of this invention is to provide a wire supply method and apparatus for a high speed stator winding machine that enables the winding of coils with tighter turns resulting from the wire more closely following the contours of the winding forms and minimizes wire breakage. A more specific object of this invention is to provide such a wire supply method and apparatus that is useful with stator winding machines operating in the range of 1200 or more complete strokes per minute as well as for machines operating at lower speeds.

In accordance with this invention, a method and apparatus are provided for tightly winding stator cores at high speeds using a stator winding machine of the type having means at its forward end for supporting an unwound stator core, a winding shuttle having a wire inlet at its rearward end and a wire outlet at its forward end, means for reciprocating the shuttle in forward and reverse directions along a predetermined axis and oscillating the shuttle to draw a wire from a source of wire under tension into the wire inlet and out of the wire outlet to wind a coil around surfaces of a stator core. It is contemplated that the method and apparatus of this invention will primarily be used for winding 2-pole stators wherein two coils are wound simultaneously using two strands of wire from two wire sources, but there may be applications wherein only one coil or more than two coils may be wound at one time.

The method includes the engagement of the portion of the wire about to enter the wire inlet when the shuttle approaches the end of each of its forward strokes by a convex friction plate to frictionally restrain forward movement of the wire. To this end, the friction plate is mounted on the rearward end of the shuttle and has a wire engaging surface spaced rearwardly of and confronting the wire inlet to the shuttle. This is preferably used with supply means including wire guide means for guiding the tensioned wire to the wire inlet along an axis intersecting the axis of shuttle reciprocation and intermediate the forwardmost and rearwardmost positions of the wire inlet so that the wire engages the wire engaging surface of said friction plate when the plate moves forwardly of the wire guide means.

The improved wire guide means is preferably adjustably mounted relative to the shuttle axis along paths substantially parallel to and substantially perpendicular to the shuttle axis so that the length of time during which the wire is engaged with the wire-engaging surface of the friction plate, and the length of the face engaged by the plate, may be adjusted as needed to optimize the restraint applied to the forward motion of the wire. To provide for further adjustment of the restraint, the friction plate preferably has a first pair of opposite margins and a second pair of opposite margins, the wire engaging surface having a first, longer, dimension between the first pair of opposite margins and a second, shorter, dimension between the second pair of opposite margins, and the plate may be optionally positioned so that either the longer dimension portion or the shorter dimension portion will engage the wire.

The means mounting the friction plate on the spindle may comprise a bracket having arms located out of the path of the wire portions extending from the wire guide means and the wire inlet. The use of the teachings of this invention may enable more turns of wire to be wound on the pole pieces of stator cores to thereby increase the power of the stator without increasing its size because of the compact winding of the coils. It will be appreciated that the use of this invention would add little to the cost of a stator winding machine and that substantial economies may be obtained by the use of this invention because of the reduction of scrapped parts resulting from wire breakage and loose coils.

Other objects and advantages will become apparent from the following description and the drawings.

BRIEF DESCRIPTION OF THE DRAWINGS

FIG. 4 is an elevational view of a tensioning device used in the machine of FIG. 1, clamped to a support bar which is shown in cross section.

FIG. 5 is a fragmentary cross sectional view of a portion of the shuttle of the machine of FIG. 1 and including the friction plate mounted thereon. FIG. 5 also shows, in phantom, a different orientation of the friction plate.

FIG. 6 is a cross sectional view of the shuttle, taken along line 6—6 of FIG. 5.

FIG. 7 is a cross sectional view of the shuttle similar to FIG. 6, but showing the friction plate in the orientation illustrated by phantom lines in FIG. 5.

FIG. 8 is a fragmentary exploded view illustrating the manner in which the friction plate is mounted as shown in FIG. 6.

FIG. 9 is a fragmentary exploded view similar to FIG. 8 but illustrating the manner in which the friction plate is mounted as shown in FIG. 7.

DESCRIPTION OF THE PREFERRED EMBODIMENT

Figure 1:
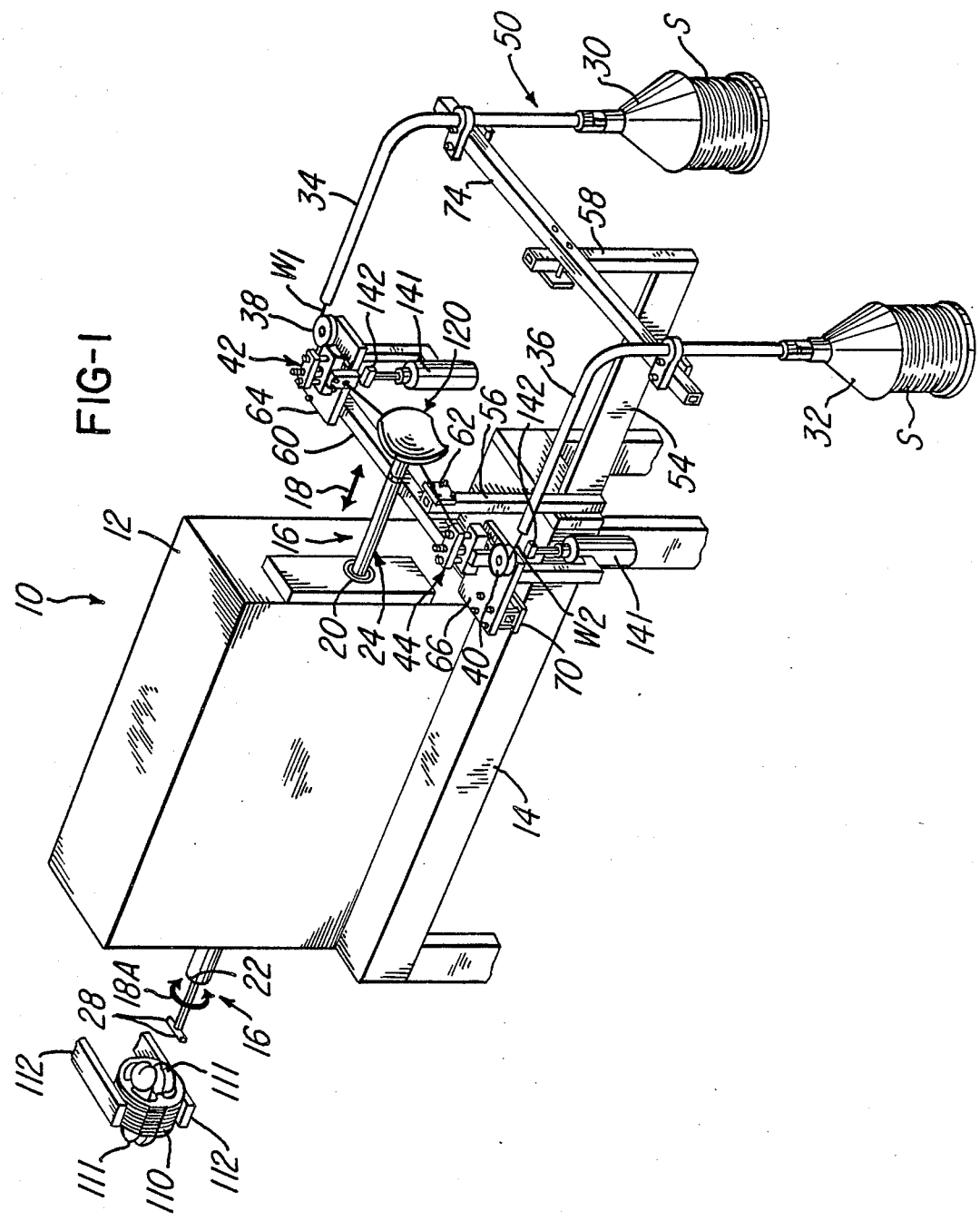
FIG. 1 is a highly diagrammatic, fragmented, and simplified isometric view of a stator winding machine embodying the present invention.

With reference to FIG. 1, this invention is disclosed embodied in a stator winding machine generally designated 10 including a drive housing 12 mounted on a machine bed 14. A shuttle, generally designated 16, is mounted for reciprocating and oscillating movements about its longitudinal axis as indicated by arrows 18 and 18A, respectively. Bearings 20 and 22 on the housing 12 establish the axis of reciprocation and oscillation.

Figure 2:
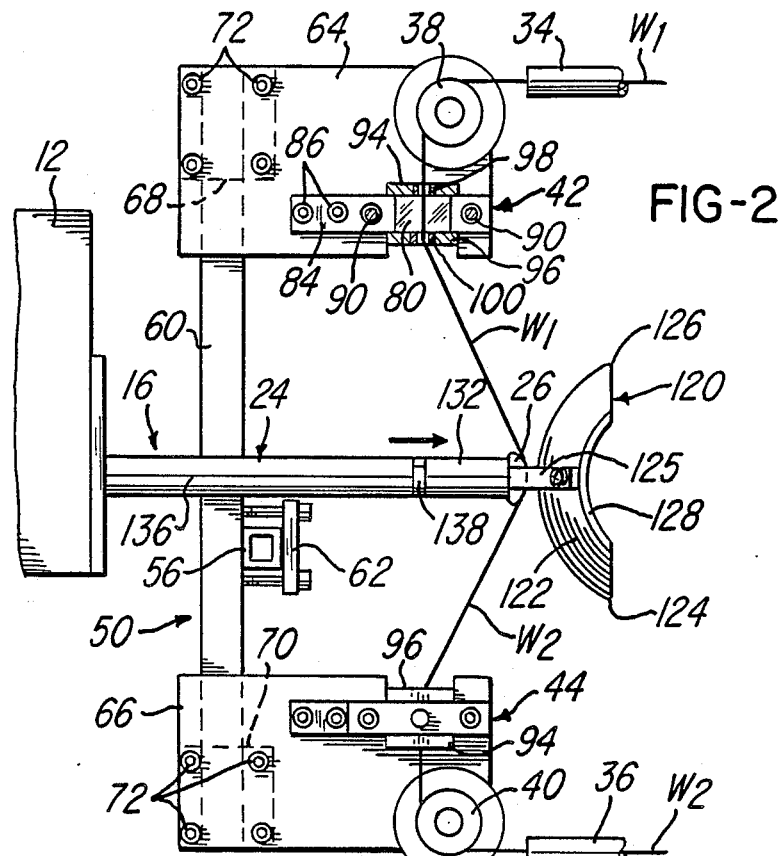
FIG. 2 is a plan view of a portion of the machine of FIG. 1.
Figure 3:
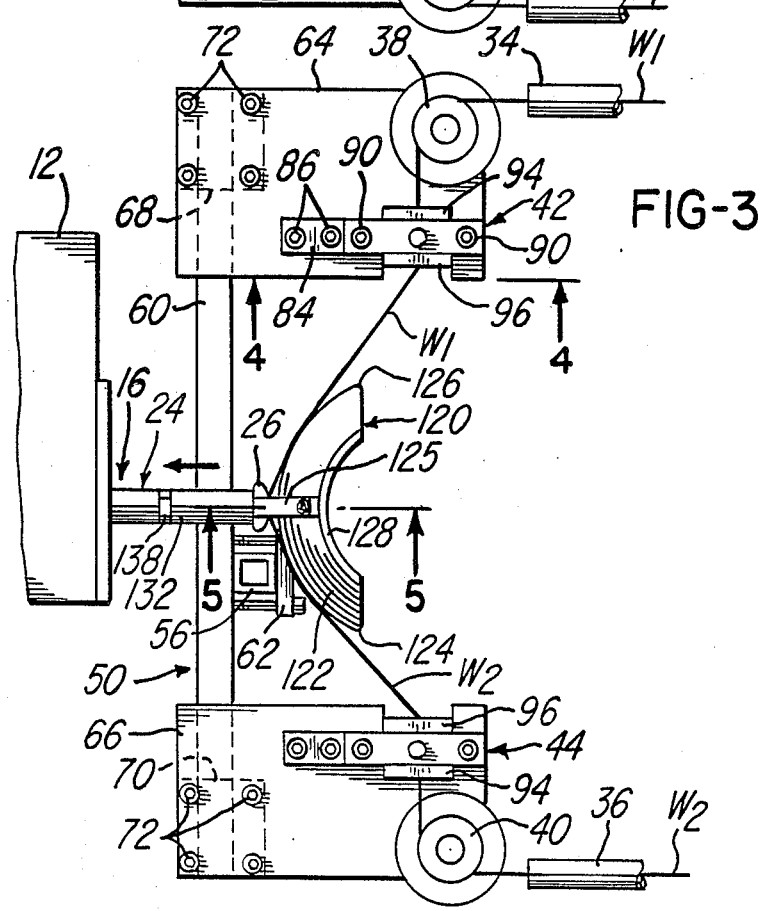
FIG. 3 is a plan view of the same portion of the machine as FIG. 2, but at different time in the operating cycle thereof.

With continued reference to FIG. 1, and also with reference to FIGS. 2, 3, and 5, the shuttle 16 includes a hollow spindle assembly 24 and a wire inlet 26 in the form of an eyelet at the rearmost end of the spindle assembly 24 which forms a wire inlet into the hollow interior of the spindle assembly 24. Shuttle 16 further includes a pair of radially outwardly projecting wire outlets or guide needles 28 (FIG. 1), such needles being fixed to the forward end of the hollow spindle assembly 24.

A pair of coil-forming wires, designated $W_1$ and $W_2$, are supplied from a pair of respective spools S, to the wire inlet 26 upwardly through a pair of respective funnel-like wire guides 30 and 32, upwardly and forwardly through a pair of respective wire guide tubes 34 and 36, forwardly and then at right angles and inwardly toward the shuttle axis around a pair of respective turning pulleys 38 and 40. As well known, for proper operation of the winding machine 10, it is essential to place the wires under some tension after the wires leave the spools and before they enter the shuttle spindle assembly 24. For this purpose, the wires $W_1$ and $W_2$ pass through a pair of respective pressure pad wire dereelers or tensioners, generally designated 42 and 44, and then directly into the wire inlet 26.

The various wire guide and tension members are mounted on a framework, generally designated 50, that provides for substantial horizontal and vertical relative adjustment of the guide and tension members. This type of framework has been used for several years and may include, as illustrated in FIG. 1, a rearwardly extending main mounting plate 54 affixed to the machine bed 14, and forward and rearward vertical masts 56 and 58, respectively, at the opposite ends of the mounting plate 54. A forward horizontal bar 60 is held in an adjusted vertical position by a clamp 62 to the forward mast 56 and provides support for small, horizontal mounting plates 64 and 66 for the turning pulleys 38 and 40 and the wire tensioners 42 and 44, respectively. Mounting plates 64 and 66 are clamped in adjustable positions to the forward horizontal bar 60 by clamps 68 and 70 which provide for an adjustment of the tensioners toward and away from the axis of the shuttle 16. As shown best in FIG. 4, the clamps include clamp bolts 72 that are spread apart by more than the width of the mounting bar 60 so an adjustment in a direction parallel to the axis of the spindle is also possible. Framework 50 also includes a rearward horizontal bar 74 clamped to the rearward mast 58 for supporting the wire guide members 30, 32, 34, and 36.

Wire dereelers or tensioners 42 and 44 could be entirely conventional but are preferably constructed as described below. Tensioner 42 shown in FIG. 4 is representative of both tensioners 42 and 44. As shown in FIG. 4, the tensioner 42 comprises a pair of opposing, carbide or other hardened steel pressure plates 80 and 82. Lower pressure plate 80 is fixedly mounted on top of a stationary lower or base plate 84 attached to the mounting plate 64 by bolts 86. Upper pressure plate 82 is affixed to the underside of a vertically movable bar 88 which is biased downwardly by a coil spring 92. The coil spring 92 encircles a spring-retaining pin 93 secured vertically to the movable bar 88 by a roll pin 95, and is trapped between the bar 88 and a downwardly facing surface of an inverted cup-shaped lower end 97 of a threaded adjusting shaft 101 which is threadedly engaged within a threaded aperture 103 in an upper stationary plate 89.

The vertically movable bar 88 has bearings 105 guided by a pair of rods 90. The rods 90 are held in a vertical orientation by being affixed to the lower stationary plate or base 84 by roll pins 107 and to the upper stationary plate 89 by bolts 109. With reference to FIGS. 2 and 4, outer and inner tensioner side plates 94 and 96, respectively, extend downwardly from the sides of the vertically movable bar 88. The wire to be tensioned is squeezed between the plates 80 and 82, being guided thereto from the turning pulley 38 through an eyelet 98 in the outer side plate 94 and directed to the shuttle inlet 26 by an eyelet 100 in the inner side plate 96.

The desired tension is placed on the wire passing between pressure plates 80 and 82 by rotating the adjusting shaft 101 in a manner which increases or decreases the pressure on the spring 92, causing a corresponding increase or decrease in pressure on the vertically movable bar 88 and the pressure plate 82 affixed thereto. The pressure, as thus adjusted, is maintained constant by tightening a locking wing nut 91 against a washer 99 around the externally-threaded adjusting shaft 101. The pressure may, of course, be readjusted by loosening the wing nut 91 and repeating the adjusting procedure.

The specific tensioning device employed forms no part of this invention and it is apparent that other devices could be used. For example, the coil spring 92 and the adjusting shaft 101 may be replaced by an air actuator (not shown) used as a spring to bias the bar 88 downwardly. The actuator could comprise a cylinder (not shown) mounted on the stationary plate 89 having a downwardly extending piston rod (not shown) engaging the top of the pin 93 and controlled by an adjustable air pressure regulator. An air spring is more expensive than the coil spring 92 but its use is preferred in some cases because of the ease, accuracy, and repeatability of adjustment of the pressure made possible by the use of an adjustable air pressure regulator.

Those familar with the art will recognize that the winding machine 10 as thus far described is representative of winding machines used for the winding of coils on 2-pole stators. In operation, at the commencement of the winding of a pair of coils, the free ends of a pair of wires are clamped in any suitable manner (not shown). A stator 110 (FIG. 1) with winding forms 111 attached is mounted as by tracks 112 forwardly of and aligned with the shuttle 16. The shuttle 16 is driven through a repeated series of forward and rearward reciprocatory motions along its longitudinal axis and at each end of its reciprocatory movement is oscillated or rotated about its longitudinal axis to accomplish the winding of coils. The winding procedures are described in greater detail in, for example, the aforementioned Moore U.S. Pat. No. 3,251,559. That patent also illustrates one type of reciprocating and oscillating drive mechanism of which numerous types have been patented and marketed. Since this invention is applicable to any type of reciprocating and oscillating drive mechanisms including conventional drives, none is illustrated herein.

In accordance with this invention, a friction plate 120 is mounted on the extreme rearward end of the shuttle 16 for engaging the portion of the wires $W_1$ and $W_2$ about to enter the wire inlet 26 when the shuttle 16 approaches the end of each of its forward strokes. Friction plate 120 has a highly polished, convex wire-engaging surface 122 confronting and spaced from the wire inlet 26 so that, as the plate 120 begins to move past the wire portions extending from the wire tensioners to the wire inlet 26, it engages these wire portions, as shown in FIG. 3, slightly taking up some of the slack that might otherwise be created as the shuttle begins to stop its forward movement and, more importantly, rubbing against the wires to frictionally restrain their forward movement when the shuttle 16 approaches the end of each of its forward strokes.

The shape of the wire-engaging face may be substantially spherical but other shapes may also be useful. In any case, the shape should be arcuately convex so that it will not snag the wire portions passing therealong. The length of the engagement between the friction plate and the wire portions will establish the degree of restraint to forward movement of the wires. In general, the finer wires should have a longer path of travel across the wire-engaging surface 122. This path length can be controlled by adjustment of the positions of the wire tensioners. Further, the friction plate 120 preferably has a first pair of opposite margins 124 and 126 and a second pair of opposite margins 128 and 130, the wire engaging surface 122 having a first, longer, dimension between the first pair of opposite margins 124, 126 and a second, shorter, dimension between the second pair of opposite margins 128, 130. In addition, as shown in FIGS. 6 through 9, the rearward end of the shuttle 16 is removably bolted to a pair of bracket arms 125 and 127 and the friction plate is provided with two sets of tapped mounting holes 129 and 131 so that the friction plate 120 may be optionally positioned so that either said longer dimension portion or said shorter dimension portion of said wire-engaging surface engages said wire to accommodate different winding applications.

To provide for the mounting of the friction plate on the shuttle 16, the bracket arms 125, 127 are mounted on a hollow tubular member 132 that, in accordance with this invention, forms part of the spindle assembly 24. The eyelet 26 is press fit into the end of the member 132 and the member 132 is internally threaded to threadedly receive an externally threaded hollow connector tube 134. Connector tube 134 is also threaded into the end of a forward, hollow, spindle tube 136, these spindle assembly parts being locked together by a jam nut 138. Optionally, the hollow tube may be also locked to the member 132 by set screws 140.

It may be noted that the wire portions between the tensioning devices and the wire inlet 26 are guided along an axis intersecting the shuttle axis and intermediate the forwardmost and rearwardmost positions of said wire inlet so that the wire engages the wire engaging surface of the friction plate when the plate moves forwardly of the wire guides.

An air cylinder 141 is shown in FIG. 4 that drives a block 142 for lifting the tensioner side plates 94 and 96 as such is necessary to temporarily remove tension from the wires.

Although the presently preferred embodiment of this invention has been disclosed, it will be understood that within the purview of this invention various changes may be made.

Having thus described my invention, I claim:

1. In a method of winding a stator using a stator winding machine of the type having means at its forward end for supporting an unwound stator core, a winding shuttle having a wire inlet at its rearward end and a wire outlet at its forward end, means for reciprocating said shuttle in forward and reverse directions along a predetermined axis and oscillating said shuttle about said predetermined axis to draw a wire from a source of wire under tension into said wire inlet and out of said wire outlet to wind a coil around surfaces of a stator core surrounding said predetermined axis, the improved method comprising the steps of providing a member having a smooth wire-engaging surface that moves relative to the portion of the wire about to enter said inlet as said shuttle reciprocates so that when said shuttle approaches the end of each of its forward strokes said surface frictionally engages said wire portion to restrain forward movement of said wire relative to said shuttle at the end of each forward stroke of said shuttle and so that said surface is not engaged with said wire during other parts of the reciprocatory movements of said shuttle.

2. The method of claim 1 wherein said smooth wire-engaging surface frictionally engaging said wire portion is a convex surface generally facing said wire inlet.

3. The method of claim 2 wherein said member having a smooth wire-engaging surface comprises a convex plate.

4. The method of claim 2 wherein said member having a smooth wire-engaging surface is affixed to said shuttle for movement therewith.

5. The method of claim 1 wherein said winding shuttle has a second wire outlet at its forward end and a second wire is drawn into said wire inlet and out of said second wire outlet simultaneously to wind a second coil around surfaces of said stator core, and wherein said member having a smooth wire-engaging surface moves relative to the portion of said second wire about to enter said inlet as said shuttle reciprocates so that when said shuttle approaches the end of each of its forward strokes said surface frictionally engages said wire portion of said second wire to restrain forward movement of said second wire relative to said shuttle at the end of each forward stroke of said shuttle and so that said surface is not engaged with said second wire during other parts of the reciprocatory movements of said shuttle.

6. The method of claim 5 wherein said smooth wire-engaging surface frictionally engaging said wire portion of each of said first mentioned wires and said second wire is a convex surface generally facing said wire inlet.

7. The method of claim 6 wherein said member having a smooth wire-engaging surface comprises a convex plate.

8. The method of claim 6 wherein said member having a smooth wire-engaging surface is affixed to said shuttle for movement therewith.

9. For use with a stator winding machine of the type having means at its forward end for supporting an unwound stator core, a winding shuttle having a wire inlet at its rearward end and a wire outlet at its forward end, guide means for guiding a wire from a wire source to said wire inlet, means for reciprocating said shuttle in forward and reverse directions along a predetermined axis and oscillating said shuttle about said predetermined axis to draw said wire from said wire source into said wire inlet and out of said wire outlet to wind a coil around surfaces of a stator core surrounding said predetermined axis, the improvement comprising friction means, and means mounting said friction means on and movable with said shuttle causing said friction means to move into engagement with the portion of the wire about to enter said inlet only when said shuttle approaches the end of each of its forward strokes to frictionally restrain forward movement of said wire relative to said shuttle as each forward stroke of said shuttle is being completed, said mounting means mounting said friction means remotely from said inlet so that the wire guided to said inlet is not engaged by said friction means during other parts of the reciprocating motion of said shuttle.

10. The improvement of claim 9 wherein said friction means comprises a friction plate mounted on said shuttle having a wire engaging surface spaced rearwardly of and confronting said wire inlet.

11. The improvement of claim 10 wherein said wire engaging surface is convex.

12. The improvement of claim 9 wherein said guide means guides the wire between said source and said wire inlet along an axis intersecting said predetermined axis and intermediate the forwardmost and rearwardmost positions of said wire inlet so that said wire engages said wire engaging surface of said friction plate to frictionally restrain said wire only when said plate is in front of and moving forwardly of said guide means.

13. For use with a stator winding machine of the type having means at its forward end for supporting an unwound stator core, a winding shuttle having a wire inlet at its rearward end and a wire outlet at its forward end, means for reciprocating said shuttle in forward and reverse directions along a predetermined axis and oscillating said shuttle about said predetermined axis to draw a wire from a wire source into said wire inlet and out of said wire outlet to wind a coil around surfaces of a stator core surrounding said predetermined axis, the improvement comprising friction means mounted on and movable with said shuttle moving into engagement with the portion of the wire about to enter said inlet when said shuttle approaches the end of each of its forward strokes to frictionally restrain forward movement of said wire through said shuttle as each forward stroke of said shuttle is being completed, said friction means comprising a friction plate mounted on said shuttle having a convex wire engaging surface, spaced rearwardly of and confronting said wire inlet and the improvement further comprising guide means for guiding wire between said wire source and said wire inlet along an axis intersecting said predetermined axis and intermediate the forwardmost and rearwardmost positions of said wire inlet so that said wire engages said wire engaging surface of said friction plate to frictionally restrain said wire only when said plate is in front of and moving forwardly of said guide means.

14. The improvement of claim 13 wherein said guide means is adjustably mounted relative to said predetermined axis along paths substantially parallel to and substantially perpendicular to said predetermined axis.

15. In a stator winding machine of the type having a winding shuttle comprising an elongate, hollow spindle having a wire inlet at its rearward end and a wire outlet at its forward end, means for reciprocating said shuttle in forward and reverse directions along a predetermined axis and oscillating said shuttle about said predetermined axis to draw a wire from a wire source into said wire inlet and out of said wire oulet to wind a coil around surfaces of a stator core surrounding said predetermined axis at the forward end of said shuttle, and guide means for guiding wire between said source and said wire inlet along an axis intersecting said predetermined axis and intermediate the forwardmost and rearwardmost positions of said wire inlet, the improvement wherein said shuttle further comprises: friction means having a wire-engaging surface; and means mounting said friction means on the rearward end of said spindle for movement therewith and with said wire-engaging surface aligned with, facing, and spaced from said wire inlet so that said wire engaging surface moves into engagement with the portion of the wire about to enter said inlet only when said shuttle approaches the end of each of its forward strokes to frictionally restrain forward movement of said wire through said shuttle at the end of each forward stroke of said shuttle.

16. The improvement of claim 15, wherein said wire-engaging surface is convex.

17. The improvement of claim 16 wherein said friction means comprises a friction plate.

18. The improvement of claim 15 wherein said means mounting said friction means on said spindle comprises a bracket having arms located out of the path of the wire portions extending from said wire guide means and said wire inlet.

19. The improvement of claim 18 wherein said friction means comprises a friction plate.

20. The improvement of claim 15 wherein said friction means comprises a friction plate.

21. In a stator winding machine of the type having a winding shuttle comprising an elongate, hollow spindle having a wire inlet at its rearward end and a wire outlet at its forward end, means for reciprocating said shuttle in forward and reverse directions along a predetermined axis and oscillating said shuttle about said predetermined axis to draw a wire from a wire source into said wire inlet and out of said wire outlet to wind a coil around surfaces of a stator core surrounding said predetermined axis at the forward end of said shuttle, and guide means for guiding wire between said source and said wire inlet along an axis intersecting said predetermined axis and intermediate the forwardmost and rearwardmost positions of said wire inlet, the improvement wherein said shuttle further comprises: a friction plate having a wire-engaging surface; means mounting said friction plate on the rearward end of said spindle for movement therewith and with said wire-engaging surface aligned with, facing, and spaced from said wire inlet so that said wire-engaging surface moves into engagement with the portion of the wire about to enter said inlet when said shuttle approaches the end of each of its forward strokes to frictionally restrain forward movement of said wire through said shuttle at the end of each forward stroke of said shuttle, said friction plate having a first pair of opposite margins and a second pair of opposite margins, said wire-engaging surface having a first, longer, dimension between said first pair of opposite margins and a second, shorter, dimension between said second pair of opposite margins, and said means mounting said friction plate comprises means to enable said plate to be optionally positioned so that either said longer dimension portion or said shorter dimension portion of said wire-engaging surface engages said wire.

22. The improvement of claim 21 wherein said means mounting said friction plate on said spindle comprises a bracket having arms located out of the path of the wire portions extending from said wire guiding means and said wire inlet.

23. The improvement of claim 22 wherein said wire-engaging surface is convex.

24. The improvement of claim 22 wherein said wire-engaging surface is highly polished.

25. For use with a stator winding machine or the type having means at its forward end for supporting an unwound stator core, a winding shuttle having a wire inlet at its rearward end and a pair of wire outlets at its forward end, guide means for guiding a pair of wires from a pair of wire sources to said wire inlet, means for reciprocating said shuttle in forward and reverse directions along a predetermined axis and oscillating said shuttle about said predetermined axis to draw said pair of wires from said pair of wire sources into said wire inlet and separately out of said wire outlets simultaneously to wind a pair of coils around surfaces of a stator core surrounding said predetermined axis, the improvement comprising friction means, and means mounting said friction means on and movable with said shuttle causing said friction means to move into engagement with the portions of the wires about to enter said inlet only when said shuttle approaches the end of each of its forward strokes to frictionally restrain forward movement of said wires relative to said shuttle at the end of the forward stroke of said shuttle, said mounting means mounting said friction means remotely from said inlet so that the wires guided to said inlet are not engaged by said friction means during other parts of the reciprocating motion of said shuttle.

26. The improvement of claim 25 wherein said means mounted on and movable with said shuttle comprises a friction plate having a wire engaging surface spaced rearwardly of and confronting said wire inlet.

27. The improvement of claim 26 wherein said wire engaging surface is convex.

28. The improvement of claim 26 wherein said guide means guides the pair of wires between said source and said wire inlet along respective axes intersecting said predetermined axis and intermediate the forwardmost and rearwardmost positions of said wire inlet so that said wires engage said wire engaging surface of said friction plate when said plate moves forwardly of said guide means.

29. The improvement of claim 28 wherein said guide means is adjustably mounted relative to said predetermined axis along paths substantially parallel to and substantially perpendicular to said predetermined axis.

30. In a stator winding machine of the type having a winding shuttle comprising an elongate, hollow spindle having a wire inlet at its rearward end and a wire outlet at its forward end, means for reciprocating said shuttle in forward and reverse directions along a predetermined axis and oscillating said shuttle about said predetermined axis to draw a pair of wires from a pair of wire sources into said wire inlet and separately out of said wire outlets simultaneously to wind a pair of coils around surfaces of a stator core surrounding said predetermined axis at the forward end of said shuttle, and guide means for guiding the wires between said sources and said wire inlet along axes intersecting said predetermined axis and intermediate the forwardmost and rearwardmost positions of said wire inlet, the improvement wherein said shuttle further comprises: a friction means having a wire-engaging surface; and means mounting said friction means on the rearward end of said spindle for movement therewith and with said wire-engaging surface aligned with, facing, and spaced from said wire inlet of said spindle so that said wire engaging surface moves into engagement with the portions of the wires about to enter said inlet only when said shuttle approaches the end of each of its forward strokes to frictionally restrain forward movements of the wires through said shuttle at the end of each forward stroke of said shuttle.

31. The improvement of claim 30 wherein said wire-engaging surface is convex.

32. The improvement of claim 30 wherein said means mounting said friction plate on said spindle comprises a bracket having arms located out of the path of the wire portions extending from said wire guiding means and said wire inlet.

33. In a stator winding machine of the type having a winding shuttle comprising an elongate, hollow spindle having a wire inlet at its rearward end and a wire outlet at its forward end, means for reciprocating said shuttle in forward and reverse directions along a predetermined axis and oscillating said shuttle about said predetermined axis to draw a pair of wires from a pair of wire sources into said wire inlet and separately out of said wire outlets simultaneously to wind a pair of coils around surfaces of a stator core aligned with said predetermined axis at the forward end of said shuttle, and means for guiding the wires between said sources and said wire inlet along axes intersecting said predetermined axis and intermediate the forwardmost and rearwardmost positions of said wire inlet, the improvement wherein said shuttle comprises: a friction plate having a wire-engaging surface; means mounting said friction plate on the rearward end of said spindle for movement therewith and with said wire-engaging surface aligned with, facing, and spaced from said wire inlet of said spindle so that said friction engaging surface moves into engagement with the portions of the wires about to enter said inlet when said shuttle approaches the end of each of its forward strokes to frictionally restrain forward movements of the wires through said shuttle at the end of each forward stroke of said shuttle, said friction plate having a first pair of opposite margins and a second pair of opposite margins, said wire-engaging surface having a first, longer, dimension between said first pair of opposite margins and a second, shorter, dimension between said second pair of opposite margins, and said means mounting said friction plate comprises means to enable said plate to be optionally positioned so that either said longer dimension portion or said shorter dimension portion of said wire-engaging surface engages said wires.

34. The improvement of claim 33 wherein said means mounting said friction plate on said spindle comprises a bracket having arms located out of the path of the wire portions extending from said wire guiding means and said wire inlet.

35. The improvement of claim 34 wherein said wire-engaging surface is convex.

36. The improvement of claim 34 wherein said wire-engaging surface is highly polished.

* * * * *